US008173325B2

(12) United States Patent
Takagi et al.

(10) Patent No.: US 8,173,325 B2
(45) Date of Patent: May 8, 2012

(54) FUNCTIONAL MEMBRANE AND ELECTROLYTE MEMBRANE FOR FUEL CELLS AND METHOD FOR PRODUCING THE SAME

(75) Inventors: Shigeharu Takagi, Nishikamo-gun (JP); Misaki Kobayashi, Nishikamo-gun (JP); Toshiya Saito, Okazaki (JP); Masaru Yoshida, Takasaki (JP); Masaharu Asano, Takasaki (JP); Tetsuya Yamaki, Takasaki (JP)

(73) Assignees: Japan Atomic Energy Agency, Naka-gun (JP); Toyota Jidosha Kabushiki Kaisha, Toyota (JP)

( * ) Notice: Subject to any disclaimer, the term of this patent is extended or adjusted under 35 U.S.C. 154(b) by 1300 days.

(21) Appl. No.: 11/884,011

(22) PCT Filed: Feb. 20, 2006

(86) PCT No.: PCT/JP2006/303504
§ 371 (c)(1),
(2), (4) Date: Aug. 9, 2007

(87) PCT Pub. No.: WO2006/090862
PCT Pub. Date: Aug. 31, 2006

(65) Prior Publication Data
US 2008/0160374 A1    Jul. 3, 2008

(30) Foreign Application Priority Data

Feb. 25, 2005  (JP) ................................. 2005-051525

(51) Int. Cl.
*H01M 8/10*        (2006.01)
(52) U.S. Cl. ........ 429/494; 429/493; 429/492; 429/491; 429/479
(58) Field of Classification Search .................. 429/494, 429/493, 492, 491, 479
See application file for complete search history.

(56) References Cited

FOREIGN PATENT DOCUMENTS

| JP | A 6-007656 | 1/1994 |
|---|---|---|
| JP | A 2001-348439 | 12/2001 |
| JP | A 2002-348389 | 12/2002 |
| JP | A 2003-082129 | 3/2003 |
| JP | A 2003-261697 | 9/2003 |
| JP | A 2004-010744 | 1/2004 |
| JP | A 2004-014436 | 1/2004 |
| JP | A 2004-051685 | 2/2004 |
| JP | A 2004-055382 | 2/2004 |
| JP | A-2004-79536 | 3/2004 |
| JP | A-2004-253147 | 9/2004 |
| JP | A 2004-300360 | 10/2004 |
| JP | A 2005-063778 | 3/2005 |
| JP | A 2005-078849 | 3/2005 |
| JP | A 2005-142014 | 6/2005 |

OTHER PUBLICATIONS

V. V. Shirkova et al., "Graft Polymerization into the Latent Tracks of Some Perfluoropolymers Films Irradiated by Heavy Ions", Radiation Measurements, vol. 34, 2001, pp. 61-64.
H. Omichi et al., "Application of Ion Beams to Synthesis of Environmentally Responsive Track Membranes", Journal of Nuclear Materials, vol. 248, 1997, pp. 354-359.
M. Yoshida et al., "Substrate-Specific Functional Membranes Based on Etched Ion Tracks", Radiation Measurements, vol. 28, Nos. 1-6, 1997, pp. 799-810.
T. Yamaki et al., "Preparation of Proton Exchange Membranes Based on Crosslinked Polytetrafluoroethylene for Fuel Cell Applications", Polymer, vol. 45, 2004, pp. 6569-6573.
H. Kudoh et al., "Observation of Latent Tracks Formed by Heavy Ion Irradiation in Poly(methyl methacrylate)", Journal of Polymer Science, vol. 39, 2001, pp. 757-762.
Baker, "Membrane Technology and Applications", 2004, pp. 314-317.
Office Action issued in Japanese Patent Application No. 2005-051525, on Apr. 6, 2010 (with translation).
M. Sugimoto et al., "Processing of nanomaterial with ion beam and applied use of nanomaterial," Nuclear Viewpoints.(*Genshityoku eye*), Japan, 2003, vol. 49, No. 5, pp. 9-13 (with translation).
Apr. 6, 2010 Office Action issued in Japanese Patent Application No. 2005-051525 (with translation).

*Primary Examiner* — Helen O Conley
(74) *Attorney, Agent, or Firm* — Oliff & Berridge, PLC

(57) ABSTRACT

A functional membrane is provided, which has high functionality combined with the gas barrier performance and mechanical strength inherent in a polymer film substrate. In particular, a polymer electrolyte membrane is provided, which is excellent in terms of high proton conductivity and gas barrier performance and is most appropriate to serve as a polymer electrolyte membrane for fuel cells. A method for producing a functional membrane is provided, which comprises: a step of ion irradiation, in which active species are generated in a polymer film substrate containing nonconductive inorganic particles by irradiating the polymer film substrate with high-energy heavy ions to the extent of $10^4/cm^2$ to $10^{14}/cm^2$; and a step of graft polymerization subsequent to the step of ion irradiation, in which one or more monomers selected from group A consisting of monomers containing useful functional groups are added such that the monomers are graft polymerized with the polymer film substrate.

37 Claims, No Drawings

FUNCTIONAL MEMBRANE AND ELECTROLYTE MEMBRANE FOR FUEL CELLS AND METHOD FOR PRODUCING THE SAME

TECHNICAL FIELD

The present invention relates to novel functional membranes obtained by utilizing latent tracks or ion penetration made by high-energy heavy ions and a method for producing the same. Also, the present invention relates to electrolyte membranes for fuel cells that are excellent in terms of gas barrier performance and mechanical strength, and a method for producing the same.

Specifically, the present invention relates to biomimetic bioreactors, conversion reactors for biomasses obtained by enzyme immobilization, ion exchange membranes excellent in terms of ion conductivity and selectivity, ion exchange membranes for secondary cells and fuel cells, functional membranes suitable to act as, for example, selective amino aid separator membranes using electrodialysis, and a method for producing the same.

Further, the present invention relates to a method for producing solid polymer electrolyte membranes that serve as polymer ion exchange membranes, which are suitably used for fuel cells. Particularly, the present invention relates to solid polymer electrolyte membranes that serve as solid polymer membranes suitable for fuel cells, which have excellent gas barrier performance and ion exchange capacities, and a method for producing the same.

BACKGROUND ART

In fuel cells, a fuel such as hydrogen or methanol is electrochemically oxidized so as to directly convert chemical energy of such fuel into electric energy, such that the energy can be extracted. In recent years, fuel cells have been attracting attention as clean electric energy supply sources. Particularly, solid polymer fuel cells using proton conductive membranes as electrolytes can achieve high power densities, and they can be operated at low temperatures. Thus, solid polymer fuel cells have been expected to serve as power supply sources for electric cars.

In the basic structure of such solid polymer fuel cell, a single cell is constituted with an electrolyte membrane sandwiched in contact with a pair of gas diffusion electrodes having catalyst layers, and current collectors are disposed both sides of the single cell. To the gas diffusion electrode (anode) on one side of the electrolyte membrane, a fuel such as hydrogen or methanol is supplied. Also, to the gas diffusion electrode (cathode) on the other side thereof, an oxidant such as oxygen or air is supplied. Then, by connecting an external load circuit to both gas diffusion electrodes, such solid polymer fuel cell can be activated. At such time, protons generated at the anode move to the cathode by passing through the electrolyte membrane so as to react with oxygen at the cathode, resulting in water generation. Here, the electrolyte membrane functions as a proton-transferring medium and a diaphragm between hydrogen gas and oxygen gas. Thus, a polymer electrolyte membrane for fuel cells is required to be excellent in terms of gas barrier performance, as well as to have the high proton conductivity, strength, and chemical stability.

Conventional so-called functional membranes have been problematic due to the fact that functional groups are distributed over such membranes in a random manner, and that when such membranes have a labyrinth or mesh structure, in which functional groups are contained, functional groups cannot be controlled in terms of spatial distributions or densities.

Specifically, in the case of a commercially available electrolyte membrane such as Nafion (trade name) or a solid polymer electrolyte membrane produced through radiation graft polymerization, hydrophilic cation exchange groups are uniformly distributed inside of a membrane, resulting in swelling of the membrane due to excessive moisture. As a result, interaction forces between molecules decline, so that excessive crossover of hydrogen or methanol through the membrane occurs. In addition, it has been attempted by Gore, Tokuyama Corp., etc. to fill a porous membrane with very high porosity, which has a series of holes in three dimensions, with ion exchange resins; however, the presence of ion exchange resins that are not involved in cation exchange results in excessive swelling of the membrane. Further, the porous substrate used is limited to a substrate comprising polytetrafluoroethylene or polyethylene, which can become porous. Furthermore, originally, such substrate lacks the gas barrier performance that is required for electrolyte membranes for fuel cells. Therefore, the characteristics of such solid polymer electrolyte membrane obtained have not been sufficient in the light of the required characteristics for fuel cells.

DISCLOSURE OF THE INVENTION

It is an object of the present invention to provide a functional membrane that is used for a variety of applications and has a high functionality combined with the gas barrier performance and mechanical strength inherent in a polymer film substrate. Particularly, it is an object of the present invention to provide a polymer electrolyte membrane that is excellent in terms of high proton conductivity, gas barrier performance, and mechanical strength and is most appropriate to serve as a polymer electrolyte membrane for fuel cells.

Inventors of the present invention have found that the above problem can be solved by graft polymerization using active species generated in a polymer film containing nonconductive inorganic particles, which comprises, for example, polytetrafluoroethylene (PTFE), by irradiating the film with heavy ions of elements such as C, K, N, and He under specific conditions. This has led to the completion of the present invention.

That is, in a first aspect, the present invention is an invention of a method for producing a functional membrane. The method comprises: a step of ion irradiation, in which a polymer film substrate containing nonconductive inorganic particles is irradiated with high-energy heavy ions to the extent of $10^4/cm^2$ to $10^{14}/cm^2$ such that active species are generated in the film substrate; and a step of graft polymerization subsequent to the ion irradiation step, in which one or more monomers selected from group A consisting of monomers containing useful functional groups are added such that the monomers are graft-polymerized with the film substrate. Thus, a functional membrane, in which functional groups are introduced exclusively into latent tracks, which are damaged sites created by ion irradiation, can be obtained. Herein, in the ion irradiation step, latent tracks that result from damage created by high-energy heavy ion irradiation may penetrate the film.

According to the present invention, functionality can be imparted to a polymer film substrate containing nonconductive inorganic particles by introducing functional groups exclusively into latent tracks several hundred nanometers in diameter, which are damaged sites created by high-energy heavy ion irradiation. Thus, physical properties of each polymer film substrate can be maintained, and in addition, functional groups can be controlled in terms of positions, spatial distributions, and densities. Examples of physical properties of polymer film substrates include gas barrier performance, mechanical strength, and dimensional stability.

When latent tracks, which are damaged sites created by high-energy heavy ion irradiation, have not penetrated the film, it is preferable to produce through holes on the film by etching. In such case, the present invention relates to a method for producing a functional membrane comprising: a step of ion irradiation, in which a polymer film substrate containing nonconductive inorganic particles is irradiated with high-energy heavy ions to the extent of $10^4/cm^2$ to $10^{14}/cm^2$ such that radiation damage occurs thereto; a step of etching subsequent to the step of ion irradiation, in which the radiation damage is subjected to chemical or thermal etching treatment such that through holes having cylindrical, conical, hand drum-shaped (bi-concave), or funnel-shaped cross-sections are formed on the film substrate; and a step of graft polymerization, in which one or more monomers selected from group A consisting of monomers containing useful functional groups are added to the thus obtained perforated film substrate with the use of active species remaining in latent tracks, which are damaged sites created by ion irradiation, or active species newly generated by gamma-ray, electron beam, or plasma irradiation in vacuo or under an inactive gas atmosphere such that the monomers are graft polymerized exclusively with the surface or hole walls of the film substrate.

In the present invention, radiation damage occurs to a polymer film substrate containing nonconductive inorganic particles due to high-energy heavy ion irradiation, and the radiation damage is subjected to chemical or thermal etching treatment, such that functionality can be imparted to the film substrate by introducing functional groups exclusively to the surface or hole walls of the perforated film substrate obtained by forming through holes on the film substrate. Thus, physical properties of each polymer film substrate can be maintained, functional groups can be controlled in terms of positions, spatial distributions, and densities, and in addition, through holes can be controlled to have cylindrical, conical, hand drum-shaped (bi-concave), or funnel-shaped cross-sections.

When using the active species remaining in the latent tracks, preferably, the above monomers are graft polymerized exclusively with hole walls of through holes 1 nm to 250 nm in pore size. In addition, when using the active species newly generated by gamma-ray, electron beam, or plasma irradiation in vacuo or under an inactive gas atmosphere, preferably, the monomers are graft polymerized exclusively with hole walls of through holes 1 nm to 5 µm in pore size and the surface of the film substrate. Here, in the step of graft polymerization, the monomers can be graft polymerized, following gamma-ray, electron beam, or plasma irradiation. Or, in the step of graft polymerization, the monomers can be simultaneously graft polymerized by gamma-ray, electron beam, or plasma irradiation after being introduced into the film substrate.

Preferably, a polymer film substrate used in the present invention has an oxygen permeability coefficient of 10.0 $[cc*mm/(m^2*day*atm)]$ or less at room temperature, such that the film substrate is excellent in terms of gas barrier performance and exhibits the performance inherent in a polymer film substrate.

Preferably, the above polymer film substrate and one or more monomers selected from group A consisting of monomers containing useful functional groups comprise elements classified as the same species so that graft chains do not impregnate the polymer film substrate upon graft polymerization. For instance, when the polymer film substrate comprises hydrocarbon polymers, one or more monomers selected from group A consisting of monomers containing useful functional groups are hydrocarbon monomers. Also, when the polymer film substrate comprises fluorocarbon polymers, one or more monomers selected from group A consisting of monomers containing useful functional groups are fluorocarbon monomers.

In the above step of graft polymerization, one or more monomers selected from group C consisting of functional monomers having molecular weights of 200 or greater can be added. Such functional monomers having a molecular weight of 200 or greater are less likely to impregnate a polymer film substrate during graft polymerization, so that functional groups can be introduced exclusively into latent tracks.

In the above step of graft polymerization, preferably, the graft ratio is 20% or less, and particularly preferably, 10% or less.

In the above step of graft polymerization, one or more monomers selected from group D consisting of monomers containing useful functional groups, which are graft polymerized With difficulty, can be added.

Also, after the step of ion irradiation, it is preferable in the practice of the step of graft polymerization that the above film substrate be allowed to come into contact with a gas such as hydrogen or methane such that the above active species are made to disappear. Then, the film substrate is irradiated with gamma rays, an electron beam, or plasma in vacuo or under an inactive gas atmosphere such that active species are generated again.

A polymer film substrate without a crosslinking structure can be used as the above polymer film substrate. However, when using a polymer film substrate to which a crosslinking structure has been imparted, it is possible to achieve desired strength and physical/chemical stability. A variety of polymer materials can be used for the above polymer film substrate. Preferably, the polymer film substrate is composed of a hydrocarbon, fluorocarbon, or hydrocarbon/fluorocarbon polymer film.

In a second aspect, the present invention relates to a functional membrane produced by the above production method. For instance, such functional membrane is made up of a polymer film substrate containing nonconductive inorganic particles that has an oxygen permeability coefficient of 10.0 $[cc*mm/(m^2*day*atm)]$ or less at room temperature and pore sizes of 1 nm to 5 µm, and preferably 1 nm to 250 nm.

In a third aspect, the present invention is a method for producing an electrolyte membrane for fuel cells. The method comprises: a step of ion irradiation, in which a polymer film substrate containing nonconductive inorganic particles is irradiated with and penetrated by high-energy heavy ions to the extent of $10^4/cm^2$ to $10^{14}/cm^2$ such that active species are generated in the film substrate; and a step of graft polymerization, in which one or more monomers selected from group A consisting of monomers containing cation exchange groups or functional groups capable of being transformed into cation exchange groups in subsequent steps are added such that the monomers are graft polymerized with the film substrate.

Also, after the step of ion irradiation, it is preferable in the practice of the step of graft polymerization that the above film substrate be allowed to come into contact with a gas such as hydrogen or methane such that the above active species are made to disappear. Then, the film substrate is irradiated with gamma rays, an electron beam, or plasma in vacuo or under an inactive gas atmosphere such that active species are generated again.

In addition, in the method for producing an electrolyte membrane for fuel cells of the present invention, a polymer film substrate containing nonconductive inorganic particles may be penetrated by chemical or thermal etching treatment, although, not by irradiation with high-energy heavy ions to the extent of $10^4/cm^2$ to $10^{14}/cm^2$ as described above. In such case, the present invention comprises: a step of ion irradiation, in which a polymer film substrate containing nonconductive inorganic particles is irradiated with high-energy heavy ions to the extent of $10^4/cm^2$ to $10^{14}/cm^2$ such that radiation damage occurs thereto; a step of etching subsequent to the step of ion irradiation, in which the radiation damage is subjected to chemical or thermal etching treatment such that through holes having cylindrical, conical, hand drum-shaped (bi-concave), or funnel-shaped cross-sections are formed on the film substrate; and a step of graft polymerization, in which one or more monomers selected from group A consisting of monomers containing useful functional groups are added to the thus obtained perforated film substrate with the use of active species remaining in latent tracks, which are damaged sites created by ion irradiation, or active species newly generated by gamma-ray, electron beam, or plasma irradiation in vacuo or under an inactive gas atmosphere such that the monomers are graft polymerized exclusively with the surface or hole walls of the film substrate.

According to the method for producing an electrolyte membrane for fuel cells of the present invention, ion exchange ability can be imparted to a polymer film substrate containing nonconductive inorganic particles in a manner such that cation-exchange functional groups are introduced exclusively into radiation damage sites on the film substrate penetrated in the direction of the thickness thereof due to high-energy heavy ion irradiation. Therefore, such film substrate is characterized by the following (A) to (D):

(A) physical properties of each polymer film substrate can be maintained due to the low porosity thereof, and particularly, gas barrier performance and mechanical strength of a polymer film substrate containing nonconductive inorganic particles can be made effective even after being subjected to treatment;

(B) functional groups can be controlled in terms of positions, spatial distributions, and densities; and (C) a small amount of ion exchange resin used for filling results in the suppression of swelling of the resin due to moisture, and an ion irradiation method can be applied to any polymer material capable of being formed into a film, even while excluding existing porous substrates, so that (D) physical properties can be easily controlled in terms of the proton conductivity, gas barrier performance, and mechanical strength of an ion exchange membrane.

Preferably, a polymer film substrate used in the present invention has an oxygen permeability coefficient of 10.0 $[cc*mm/(m^2*day*atm)]$ or less at room temperature, such that such polymer film substrate is excellent in terms of gas barrier performance, and exhibits the performance inherent in a polymer film substrate. Also, when it is used for fuel cells, such polymer film substrate is preferable since it shows excellent power generation performance by allowing protons to permeate therethrough while being resistant to gas.

Preferably, one or more monomers selected from group A consisting of monomers containing cation exchange groups or functional groups capable of being transformed into cation exchange groups in subsequent steps are added to the perforated film substrate obtained in the above step of etching with the use of active species remaining in latent tracks, which are damaged sites created by ion irradiation, or active species newly generated by gamma-ray, electron beam, or plasma irradiation in vacuo or under an inactive gas atmosphere, such that the monomers are graft polymerized exclusively with the surface or hole walls of the film substrate so as to introduce the functional groups.

Also preferably, up to 80 mol % of one or more monomers of group B consisting of crosslinking agents for group A are added in the step of graft polymerization, such that paths of cation exchange groups are formed in restricted areas.

A polymer film substrate without a crosslinking structure can be used as the above polymer film substrate. However, when using a polymer film substrate with a crosslinking structure, it is possible to achieve desired strength and physical/chemical stability. A variety of polymer materials can be used for the above polymer film substrate. Preferably, the polymer film substrate is composed of a hydrocarbon, fluorocarbon, or hydrocarbon/fluorocarbon polymer film.

In the present invention, preferably, the graft ratio is 20% or less, and particularly preferably, 10% or less. When using active species remaining in the latent tracks, preferably, the above monomers are graft polymerized exclusively with hole walls of through holes up to 250 nm in pore size.

In addition, when using active species newly generated by gamma-ray, electron beam, or plasma irradiation in vacuo or under an inactive gas atmosphere, preferably, the monomers are graft polymerized exclusively with hole walls of through holes 1 μm in pore size of the film substrate. Particularly preferably, all through holes are filled with the cation exchange groups, and no cation exchange group is introduced inside of the film substrate as a result of the introducing of the cation exchange groups, followed by the graft polymerization of the monomers.

In the step of graft polymerization, it is possible to add one or more monomers selected from group C consisting of monomers that have molecular weights of 200 or greater and contain cation exchange groups or functional groups capable of being transformed into cation exchange groups in subsequent steps. Functional monomers having molecular weights of 200 or greater are less likely to impregnate a polymer film substrate during graft polymerization so that functional groups can be introduced exclusively into latent tracks.

In a fourth aspect, the present invention relates to an electrolyte membrane for fuel cells produced by the above production method. For instance, such electrolyte membrane is made up of a polymer film substrate containing nonconductive inorganic particles that has an oxygen permeability coefficient of 10.0 $[cc*mm/(m^2*day*atm)]$ or less at room temperature and paths that contain cation exchange groups and have pore sizes of 1 nm to 5 μm, and preferably 1 nm to 250 nm.

In the functional membrane of the present invention, functionality can be imparted to a polymer film substrate containing nonconductive inorganic particles by introducing functional groups exclusively into latent tracks, which are damaged sites created by high-energy heavy ion irradiation. Thus, the physical properties of a polymer film substrate containing nonconductive inorganic particles can be maintained. In addition, radiation damage occurs to a polymer film substrate containing nonconductive inorganic particles as a result of high-energy heavy ion irradiation, and the radiation damage is subjected to chemical or thermal etching treatment, such that functionality can be imparted to the film substrate by introducing functional groups exclusively into the surface or hole walls of a perforated film substrate obtained by forming through holes having cylindrical, conical, hand drum-shaped (bi-concave), or funnel-shaped cross-sections on the film substrate. Thus, physical properties of a polymer film substrate containing nonconductive inorganic particles can be maintained.

BEST MODE FOR CARRYING OUT THE INVENTION

Examples of a polymer film substrate used in the present invention include, but are not particularly limited to, a hydrocarbon polymer film excellent in terms of monomer solution permeability. Meanwhile, a fluorine polymer film is not excellent in terms of monomer solution permeability. However, after ion irradiation of such film, monomers permeate the film, resulting in a graft reaction progress therein.

Specifically, a film substrate that may be used comprises ultra high molecular weight polyethylene, polypropylene, polystyrene, polyamide, aromatic polyamide, polyethylene terephtalate, polyethylene naphthalate, polycarbonate, polyetherketone, polyetheretherketone, polyethersulfone, polyphenylene sulfide, polysulfone, or the like.

Also, a film substrate that may be used is a polyimide polymer film comprising polyimide, polyetherimide, polyamide imide, polybenzimidazole, or polyetheretherimide.

Further, a film substrate that may be used comprises polyvinylidene fluoride, ethylene-tetrafluoroethylene copolymers, polytetrafluoroethylene, tetrafluoroethylene-propylene hexafluoride copolymers, or tetrafluoroethylene- perfluoroalkyl vinyl ether copolymers.

Among the above film substrates, in a fluorine film, a crosslinking structure is formed in the polymer structure upon crosslinking so that the monomer-graft ratio is improved, and in addition, heat resistance is improved. Thus, the deterioration of membrane strength due to irradiation can be suppressed. Therefore, to produce fuel cells that show high performance in applications at high temperatures, it is preferable to use crosslinked films. The inventors of the present invention have already found that the graft ratio of crosslinked polytetrafluoroethylene is significantly improved compared with that of uncrosslinked polytetrafluoroethylene when styrene, for example, is used as a graft monomer, so that sulfonic acid groups can be introduced into crosslinked polytetrafluoroethylene in amounts 2 to 10 times those of sulfonic acid groups introduced into uncrosslinked polytetrafluoroethylene.

Thus, instead of a polyethylene terephthalate film substrate, in the present invention, it is preferable to use a film substrate with a crosslinking structure, which comprises ultra-high-molecular-weight polyethylene, polypropylene, polystyrene, polyamide, aromatic polyamide, polyethylene terephtalate, polyethylene naphthalate, polycarbonate, polyetherketone, polyetheretherketone, polyethersulfone, polyphenylene sulfide, or polysulfone.

Also, it is preferable to use a film substrate with a crosslinking structure, which comprises polyimide, polyetherimide, polyamide imide, polybenzimidazole, or polyetheretherimide. Similarly, it is preferable to use a film substrate with a crosslinking structure, which comprises polyvinylidene fluoride, ethylene-tetrafluoroethylene copolymers, polytetrafluoroethylene, tetrafluoroethylene-propylene hexafluoride copolymers, or tetrafluoroethylene-perfluoroalkyl vinyl ether copolymers.

Examples of nonconductive inorganic particles incorporated into a polymer film substrate in the present invention include fine particles of metals, metal oxides, glass, or the like. Examples thereof include fine particles of $SiO_2$, $Al_2O_3$, $MgO$, $ZrO_2$, $TiO_2$, $B_2O_3$, $CaO$, $ZnO$, $BaO$, or $ThO_2$, or a mixture thereof comprising $SiO_2$—$MgO$, $SiO_2$—$Al_2O_3$, $SiO_2$—$TiO_2$, $SiO_2$—$V_2O_5$, $SiO_2$—$Cr_2O_3$, $SiO_2$—$TiO_2$—$MgO$, or the like. In addition, examples of the aforementioned inorganic fine particles include fine particles of a carbonate, sulfate, nitrate, or oxide such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, or $Li_2O$. Examples thereof further include fine particles of $H^+$ type mordenite. Of these, those that can improve gas barrier performance and mechanical strength of a polymer film substrate can be used. Specifically, preferred examples thereof include fine particles of one or more of silica ($SiO_2$), alumina ($Al_2O_3$), zirconia ($ZrO_2$), and $H^+$ type mordenite.

In the present invention, a polymer film substrate containing nonconductive inorganic particles is irradiated with high-energy heavy ions using a cyclotron accelerator or the like. Here, heavy ions are defined as ions with masses larger than that of carbon ions. Upon irradiation of such ions, radiation damage caused by ion irradiation occurs to a polymer film. The extents of radiation-damaged regions depend on the masses or energies of ions emitted. In addition, it has been known that a single ion can create a radiation damage region that extends approximately from several nanometers to several hundred nanometers (H. Kudo and Y. Morita, J. Polym. Sci., Part B, vol. 39, 757-762 (2001)).

Preferably, the number of ions used for irradiation is within the range between $10^4/cm^2$ and $10^{14}/cm^2$ to such an extent that irradiation-damaged regions created by individual ions do not overlap one another. For instance, preferably, irradiation is performed while high-energy ions are scanned, on the condition that a film substrate (10 cm×10 cm) be fixed on a table used for irradiation, which is accommodated in a irradiation chamber and is connected to a cyclone accelerator or the like, and that the inside of the irradiation chamber be evacuated to $10^{-6}$ torr or less. The extent of irradiation can be calculated based on the length of irradiation time and the ion current strength that has been predetermined using a high precision ammeter. Preferably, high-energy heavy ions used for irradiation are ions with a mass larger than that of carbon ions, and such ions can be accelerated in practice by an accelerator.

Considering the ease of ion generation and handling of ions, ion species of carbon, nitrogen, oxygen, neon, argon, krypton, xenon, and the like are preferable. In addition, to obtain an extended radiation-damaged region formed by a single ion, large-mass ions such as gold ions, bismuth ions, and uranium ions may be used. Different ion species have different ion energies. However, only energy that is sufficient to cause penetration through a polymer film substrate in the direction of its thickness is required. For instance, in the case of a 50-μm thick polyethylene terephthalate film substrate, carbon ions, neon ions, and argon ions are required to have energies of 40 MeV or more, 80 MeV or more, and 180 MeV or more, respectively. Similarly, in the case of a 100-μm thick polyethylene terephtalate film substrate, the above ions are required to have energies of 62 MeV or more, 130 MeV or more, and 300 MeV or more, respectively. In addition, 450-MeV xenon ions and 2.6-GeV uranium ions can penetrate 40- and 20-μm thick polyethylene terephthalate film substrates, respectively.

When ions used for irradiation have a range equivalent to approximately half of the thickness of a film substrate, different distributions of radiation-damaged regions can be formed on the film in the direction from the surface to the inside of the film by irradiating both sides of the film with ions of a single species or those of different species to differing extents, or with a combination of light ions having a long range and heavy ions having a short range. Upon the graft reaction described below, such different distributions allow the film to contain graft chains that differ in terms of quantity or length, or polymer structures that differ in terms of formation. As a result, the water distribution inside of the film-substrate or the fuel gas permeability of the film can be controlled utilizing changes in the distribution of sulfonic acid groups in graft chains of the film substrate.

Further, heavy ions need to have the extremely high levels of energy, as described above, so as to penetrate the thickness of a film. For instance, 22-MeV carbon ions have a range of approximately 25 μm in a polyethylene terephthalate film substrate. Thus, carbon ions cannot penetrate a 50-μm thick polyethylene terephthalate film substrate. That is, carbon ions need to have energy of approximately 40 MeV so as to penetrate a 50-μm thick polyethylene terephthalate film substrate. However, when irradiating both sides of such film substrate, 22-MeV carbon ions are sufficient to penetrate it. To generate ions having higher levels of energy, larger accelerators are required, resulting in expanded facility cost. Thus, ion irradiation of both sides of a film substrate is significantly effective for the production of an ion exchange membrane of the present invention.

To obtain a membrane having high functionality in terms of ion exchange performance or the like, the extent of ion irradiation can be increased. When the extent of ion irradiation is great, the quality of a film substrate deteriorates or the monomer graft efficiency described below declines due to overlapping radiation-damaged regions. When the extent of ion irradiation is small, the monomer graft quantity obtained is small, resulting in an insufficient ion exchange capacity. Therefore, preferably, the extent of ion irradiation is within a range between $10^4/cm^2$ to $10^{14}/cm^2$.

The expression "one or more monomers selected from group A consisting of monomers containing useful functional groups" used in the present invention indicates not only monomers containing useful functional groups but also monomers containing groups transformed into useful functional groups by reactions in subsequent steps.

In the present invention, monomers exemplified below are added to a polymer film substrate that has been irradiated with heavy ions, followed by degasification and heating, such that the monomers are graft polymerized with the film substrate. Further, in graft chains, sulfonylhalide groups [—$SO_2X^1$], sulfonate groups [—$SO_3R^1$], or halogen groups [—$X^2$] are transformed into sulfonic acid groups [—$SO_3H$]. Thus, functional membranes can be produced. In addition, in the case of phenyl, ketone, or ether groups, or the like, which are found in hydrocarbon monomer units in graft chains, sulfonic acid groups are introduced thereinto using chlorosulfonic acid, such that functional membranes can be produced. The following (1) to (6) show representative examples of group A monomers that are graft polymerized to a film substrate in the present invention:

(1) one or more monomers selected from the group consisting of sulfonyl halide group-containing monomers such as $CF_2$=$CF(SO_2X^1)$ where $X^1$ denotes a halogen group represented as —F or —Cl (the same applies hereinafter), $CH_2$=$CF(SO_2X^1)$, and $CF_2$=$CF(OCH_2(CF_2)_mSO_2X^1)$ where m denotes an integer from 1 to 4 (the same applies hereinafter);

(2) one or more monomers selected from the group consisting of sulfonate group-containing monomers such as $CF_2$=$CF(SO_3R^1)$ where $R^1$ denotes an alkyl group represented as —$CH_3$, —$C_2H_5$, or —$C(CH_3)_3$ (the same applies hereinafter), $CH_2$=$CF(SO_3R^1)$, and $CF_2$=$CF(OCH_2(CF_2)_mSO_3R^1)$;

(3) one or more monomers selected from the group consisting of $CF_2$=$CF(O(CH_2)_mX^2)$ where $x^2$ denotes a halogen group such as —Br or —Cl (the same applies hereinafter) and $CF_2$=$CF(OCH_2(CF_2)_mX^2)$;

(4) one or more monomers selected from the group consisting of acrylic monomers such as $CF_2$=$CR^2(COOR^3)$ where $R^2$ denotes —$CH_3$ or —F and $R^3$ denotes —H, —$CH_3$, —$C_2H_5$, or —$C(CH_3)_3$ (the same applies hereinafter) and $CH_2$=$CR^2(COOR^3)$;

(5) one or more monomers selected from the group consisting of styrene or styrene derivative monomers such as 2,4-dimethylstyrene, vinyltoluene, and 4-tert-butylstyrene; and (6) one or more monomers selected from the group consisting of acenaphtylene, vinylketone represented as $CH_2$=$CH(COR^4)$ where $R^4$ denotes —$CH_3$, —$C_2H_5$, or a phenyl group (—$C_6H_5$), and vinyl ether represented as $CH_2$=$CH(OR^5)$ where $R^5$ denotes —$C_nH_{2n+1}$ (n=1-5), —$CH(CH_3)_2$, —$C(CH_3)_3$, or a phenyl group.

Specific examples of "monomers of group B consisting of crosslinking agents for group A monomers" used in the present invention include divinylbenzene, triallyl cyanurate, triallyl isocyanurate, 3,5-bis(trifluorovinyl)phenol, and 3,5-bis(trifluorovinyloxy)phenol. One or more these crosslinking agents are added in an amount of 30 mol % or less based on the total monomer units, resulting in graft polymerization.

"One or more monomers selected from group C consisting of functional monomers having molecular weights of 200 or greater" used in the present invention constitute monomers having molecular weights of 200 or greater selected from group A.

Typical examples of "one or more monomers selected from group D consisting of monomers containing useful functional groups, which are graft polymerized with difficulty" include perfluorovinyl monomers shown in (1) to (3) of group A above. Such monomers are listed again as follows:

(1) one or more monomers selected from the group consisting of sulfonyl halide group-containing monomers such as $CF_2$=$CF(SO_2X^1)$ where $X^1$ denotes a halogen group represented as —F or —Cl (the same applies hereinafter), $CH_2$=$CF(SO_2X^1)$, and $CF_2$=$CF(OCH_2(CF_2)_mSO_2X^1)$ where m denotes an integer from 1 to 4 (the same applies hereinafter);

(2) one or more monomers selected from the group consisting of sulfonate group-containing monomers such as $CF_2$=$CF(SO_3R^1)$ where $R^1$ denotes an alkyl group represented as —$CH_3$, —$C_2H_5$, or —$C(CH_3)_3$ (the same applies hereinafter), $CH_2$=$CF(SO_3R^1)$, and $CF_2$=$CF(OCH_2(CF_2)_mSO_3R^1)$; and (3) one or more monomers selected from the group consisting of $CF_2$=$CF(O(CH_2)_mX^2)$ where $X^2$ denotes a halogen group such as —Br or —Cl (the same applies hereinafter) and $CF_2$=$CF(OCH_2(CF_2)_mX^2)$.

EXAMPLES

Hereafter, Examples and Comparative Examples of the present invention will be described.

Examples 1 to 13

Polymer film substrates that contain nonconductive inorganic particles and comprise, for example, polyvinylidene fluoride (hereafter to be referred to as PVDF) were used. Examined polymer film substrates containing nonconductive inorganic particles are as listed in Table 1. Also, Table 1 shows whether or not radiation crosslinking was carried out with respect to the polymer film substrates. Radiation crosslinking was carried out by irradiation with ionizing radiation under the conditions listed in Table 1.

The polymer film substrates were irradiated with heavy ions listed in Table 1.

Perforated holes were formed by etching under the conditions listed in Table 1.

Samples on which perforated holes were formed by etching were irradiated with ionizing radiation under the conditions listed in Table 1.

Next, the samples were immersed in the corresponding monomer solutions listed in Table 1 so as to be subjected to polymerization under the conditions listed in Table 1. After being subjected to sulfonation treatment or protonation treatment, the samples were immersed in pure water for washing. The aforementioned step was repeated until the solutions in which the samples had been immersed became neutralized.

The samples were dehydrated in a vacuum drying oven.

In addition, graft rates (%) of the samples were calculated in accordance with the following formula.

$$X = (W2 - W1)/W1 \times 100$$

W1: Weight of polymer film substrate before graft polymerization (g)

W2: Weight of polymer film substrate after graft polymerization (g)

In Table 1, abbreviations denote corresponding compounds as shown below.

$SiO_2$: amorphous silica (aerosil A 380)
$Al_2O_3$: alumina
PVDF: polyvinylidene fluoride
ETFE: ethylene-tetrafluoroethylene copolymer
PI: polyimide
NMXD 6: nylon
St: styrene
DVB: divinylbenzene
PFVBr: $CF_2$=CF—O—$CF_2$—$CF_2$—Br
TFS: trifluorostyrene
MeSt: methylstyrene
SSS: sodium styrenesulfonate
NaClO: sodium hypochlorite The obtained membranes were evaluated in terms of gas permeabilities, conductivities, tensile strengths, and dimensional changes. Table 2 below lists results of the evaluation, where:

dimensional change = $L_1/L_0 \times 100$ (%);
L0 = dimension of a dry electrolyte membrane at room temperature; and
$L_1$ = dimension of an electrolyte membrane saturated and swollen (with water) at 80° C.

TABLE 1

| Example | Film Substrate | Film Filler | Film Cross-linking | Ion Beam Radiation Condition | Use of Radicals in Latent Tracks | Formation of Perforated Holes by Etching (Pore Size) | Graft Polymerization Preliminary Irradiation | Graft Polymerization Subsequent Polymerization Monomer | Graft Polymerization Subsequent Polymerization Temperature, Time | Graft Ratio (%) |
|---|---|---|---|---|---|---|---|---|---|---|
| 1 | PVDF 25 μm | 5 wt % $SiO_2$ | None | 450 MeV Xe $3 \times 10^7$ ions/cm² | Yes | None | None | St, DVB | 50° C., 10 hours | 5.2 |
| 2 | PVDF 25 μm | 5 wt % $SiO_2$ | 250 kGy 60° C. | 450 MeV Xe $3 \times 10^7$ ions/cm² | Yes | None | None | St, DVB | 50° C., 30 minutes | 5.1 |
| 3 | PVDF 25 μm | 5 wt % $SiO_2$ | 250 kGy 60° C. | 450 MeV Xe $3 \times 10^7$ ions/cm² | No | 80° C., 9M KOH (110 nm) | 5 kGy, Room Temperature Argon Atmosphere | St, DVB | 50° C., 30 minutes | 8.7 |
| 4 | PVDF 25 μm | 7 wt % $Al_2O_3$ | 250 kGy 60° C. | 450 MeV Xe $3 \times 10^7$ ions/cm² | No | 80° C., 9M KOH (83 nm) | 3 kGy, Room Temperature Argon Atmosphere | St, DVB | 50° C., 15 minutes | 6.4 |
| 5 | PVDF 50 μm | 7 wt % $Al_2O_3$ | 250 kGy 60° C. | 2.5 GeV Pb $3 \times 10^6$ ions/cm² | Yes | None | None | St, DVB | 50° C., 2 hours | 7.6 |
| 6 | PVDF 25 μm | 7 wt % $Al_2O_3$ | 250 kGy 60° C. | 450 MeV Xe $3 \times 10^7$ ions/cm² | No | 80° C., 9M KOH (81 nm) | 3 kGy, Room Temperature Argon Atmosphere | TFS, DVB | 50° C., 30 minutes | 4.5 |
| 7 | PVDF 25 μm | 7 wt % $Al_2O_3$ | 250 kGy 60° C. | 450 MeV Xe $3 \times 10^7$ ions/cm² | No | 80° C., 9M KOH (81 nm) | 3 kGy, Room Temperature Argon Atmosphere | PFVBr, DVB | 50° C., 1 hour | 4.1 |
| 8 | ETFE 25 μm | 7 wt % $Al_2O_3$ | 200 kGy 60° C. | 450 MeV Xe $3 \times 10^7$ ions/cm² | Yes | None | None | TFS, DVB | 50° C., 30 minutes | 7.1 |
| 9 | PI 25 μm | 5 wt % $SiO_2$ | None | 520 MeV Kr $3 \times 10^7$ ions/cm² | Yes | None | None | MeSt, DVB | 60° C., 1 hour | 4.7 |
| 10 | PI 25 μm | 5 wt % $SiO_2$ | None | 520 MeV Kr $3 \times 10^7$ ions/cm² | No | 40° C., NaClO (pH = 9) (76 nm) | 10 kGy, Room Temperature Argon Atmosphere | MeSt, DVB | 60° C., 40 minutes | 5.5 |
| 11 | NMXD6 25 μm | 5 wt % $SiO_2$ | None | 450 MeV Xe $3 \times 10^7$ ions/cm² | Yes | None | None | SSS | 50° C., 20 minutes | 5.2 |
| 12 | NMXD6 25 μm | 5 wt % $SiO_2$ | None | 450 MeV Xe $3 \times 10^7$ ions/cm² | No | 60° C., NaClO (pH = 9) (46 nm) | 10 kGy, Room Temperature Argon Atmosphere | SSS | 40° C., 20 minutes | 5.4 |
| 13 | NMXD6 25 μm | 10 wt % $H^+$ Mordenite | None | 450 MeV Xe $3 \times 10^7$ ions/cm² | No | 60° C., NaClO (pH = 9) (48 nm) | 10 kGy, Room Temperature Argon Atmosphere | SSS | 40° C., 10 minutes | 4.9 |

TABLE 2

| Example | Hydrogen Permeability Coefficient (cc * mm/ (m2 day atm)) @80° C., 90% RH | Conductivity (S/cm) @80° C., 90% RH | Tensile Strength (MPa) @80° C., Water Saturation | Dimensional Change (%) @80° C., Water Saturation |
|---|---|---|---|---|
| 1 | 300 | 0.04 | 220 | 112 |
| 2 | 105 | 0.05 | 1800 | 108 |
| 3 | 352 | 0.09 | 1530 | 107 |
| 4 | 271 | 0.08 | 1750 | 104 |
| 5 | 84 | 0.08 | 2100 | 101 |
| 6 | 285 | 0.05 | 1730 | 103 |
| 7 | 260 | 0.06 | 1710 | 103 |
| 8 | 1100 | 0.07 | 109 | 105 |
| 9 | 64 | 0.05 | 960 | 103 |
| 10 | 210 | 0.07 | 820 | 101 |
| 11 | 6 | 0.07 | 510 | 104 |
| 12 | 9 | 0.07 | 390 | 101 |
| 13 | 5 | 0.07 | 450 | 101 |

Comparative Examples 1 to 6

Comparative Examples 1 to 6 were performed as in the cases of Examples 1 to 13, except that polymer film substrates that did not contain nonconductive inorganic particles comprising, for example, polyvinylidene fluoride (PVDF), were used. Table 3 lists fillers, whether or not radiation crosslinking was carried out, ion beam irradiation conditions, whether or not etching was carried out, graft polymerization conditions, monomers, and the like, which were examined. Abbreviations of compounds in Table 3 correspond to those in Table 1.

TABLE 4

| Comparative Example | Hydrogen Permeability Coefficient (cc * mm/ (m2 day atm)) @80° C., 90% RH | Conductivity (S/cm) @80° C., 90% RH | Tensile Strength (MPa) @80° C., Water Saturation | Dimensional Change (%) @80° C., Water Saturation |
|---|---|---|---|---|
| 1 | 2560 | 0.05 | 700 | 126 |
| 2 | 8140 | 0.08 | 610 | 121 |
| 3 | 16700 | 0.002 | 220 | 101 |
| 4 | 11200 | 0.003 | 31 | 101 |
| 5 | 1820 | 0.05 | 290 | 110 |
| 6 | 24 | 0.003 | 470 | 101 |

Based on the results listed in Tables 1-4, comparing Example 1 and Comparative Example 1, for example, it is understood that graft rates and a variety of physical properties are improved by allowing polymer film substrates to contain nonconductive inorganic particles. Further, comparing Example 1 and Example 2, it is understood that a variety of physical properties are further improved by allowing polymer film substrates to be subjected to radiation crosslinking.

Further, comparing Example 1 and Example 3, it is understood that it is also effective to form perforated holes on the polymer film substrates by etching latent tracks therein using an ion beam.

Furthermore, comparing Example 7 and Comparative Example 3, and Example 8 and Comparative Example 4, it is understood that the present invention realizes sufficient graft polymerization using even PFVBr ($CF_2=CF-O-CF_2-CF_2-Br$), which has been thought to be polymerized with difficulty by itself, and using trifluorostyrene (TFS) having a low polymerization rate.

TABLE 3

| Comparative Example | Film | | | Ion Beam | | Formation of Perforated Holes by Etching (Pore Size) | Graft Polymerization | | | |
|---|---|---|---|---|---|---|---|---|---|---|
| | Substrate | Filler | Cross-linking | Radiation Condition | Use of Radicals in Latent Tracks | | Preliminary Irradiation | Subsequent Polymerization | | Graft Ratio (%) |
| | | | | | | | | Monomer | Temperature, Time | |
| 1 | PVDF 25 μm | None | 250 kGy 60° C. | 450 MeV Xe $3 \times 10^7$ ions/cm$^2$ | Yes | None | None | St, DVB | 50° C., 8 hours | 4.8 |
| 2 | PVDF 25 μm | None | 250 kGy 60° C. | 450 MeV Xe $3 \times 10^7$ ions/cm$^2$ | No | 80° C., 9M KOH (110 nm) | 5 kGy, Room Temperature Argon Atmosphere | St, DVB | 50° C., 4 hours | 8.2 |
| 3 | PVDF 25 μm | None | 250 kGy 60° C. | 450 MeV Xe $3 \times 10^7$ ions/cm$^2$ | No | 80° C., 9M KOH (81 nm) | 3 kGy, Room Temperature Argon Atmosphere | PFVBr, DVB | 50° C., 6 hours | 0.1 |
| 4 | ETFE 25 μm | None | 200 kGy 60° C. | 450 MeV Xe $3 \times 10^7$ ions/cm$^2$ | Yes | None | None | Trifluoro-styrene, DVB | 50° C., 30 minutes | 0.4 |
| 5 | PI 25 μm | None | None | 520 MeV Kr $3 \times 10^7$ ions/cm$^2$ | Yes | None | None | MeSt, DVB | 60° C., 5 hours | 4.3 |
| 6 | NMXD6 25 μm | None | None | 450 MeV Xe $3 \times 10^7$ ions/cm$^2$ | Yes | None | None | SSS | 50° C., 1 hour | 0.7 |

The obtained membranes were evaluated in terms of gas permeabilities, conductivities, tensile strengths, and dimensional changes. Table 4 below lists results of the evaluation.

INDUSTRIAL APPLICABILITY

In the present invention, gas barrier performance, mechanical strength, dimensional stability, and proton conductivity at low moisture contents of ion exchange membranes can be improved based on the radiation-induced polymerization technology combined with technologies related to hybridization, ion penetration, graft polymerization, and the like.

That is, the functional membrane of the present invention can be provided with functional sites being controlled on the nano-order scale in a manner such that functional groups are introduced exclusively into latent tracks, which are damaged sites created by irradiating a polymer film substrate containing nonconductive inorganic particles with high-energy heavy ions. Thus, physical properties of such polymer film substrate reinforced with inorganic particles can be maintained. In addition, the functional membrane of the present invention can be provided with functional sites being controlled on the nano-order scale in a manner such that radiation damage occurs to a polymer film substrate containing nonconductive inorganic particles as a result of high-energy heavy ion irradiation, that the irradiation damage is subjected to chemical or thermal etching treatment, and that through holes having cylindrical, conical, hand drum-shaped (bi-concave), or funnel-shaped cross-sections are formed on the film substrate, such that functional groups are introduced exclusively into the surface or hole walls of the thus obtained perforated film substrate. Thus, physical properties of such polymer film substrate containing nonconductive inorganic particles can be maintained.

Accordingly, it becomes possible to provide a polymer electrolyte membrane that is excellent in terms of the high proton conductivity, gas barrier performance, and mechanical strength and is most appropriate to serve as an electrolyte membrane for fuel cells. Such polymer electrolyte membrane contributes to the spread of fuel cells.

The invention claimed is:

1. A method for producing a functional membrane comprising:
   a step of ion irradiation, in which a polymer film substrate containing nonconductive inorganic particles is irradiated with high-energy heavy ions to the extent of $10^4/cm^2$ to $10^{14}/cm^2$ such that active species are generated in the film substrate; and
   a step of graft polymerization subsequent to the ion irradiation step, in which one or more monomers selected from group A are added such that the monomers are graft polymerized with the film substrate;
   wherein group A consists of:
   (1) the group of monomers consisting of $CF_2$=$CF(SO_2X^1)$ where $X^1$ denotes a halogen group represented as —F or —Cl, $CH_2$=$CF(SO_2X^1)$, and $CF_2$=$CF(OCH_2(CF_2)_m SO_2X^1)$ where m denotes an integer from 1 to 4;
   (2) the group of monomers consisting of $CF_2$=$CF(SO_3R^1)$ where $R^1$ denotes an alkyl group represented as —$CH_3$, —$C_2H_5$, or —$C(CH_3)_3$, $CH_2$=$CF(SO_3R^1)$, and $CF_2$=$CF(OCH_2(CF_2)_m SO_3R^1)$;
   (3) the group of monomers consisting of $CF_2$=$CF(O(CH_2)_m X^2)$ where $x^2$ denotes a halogen group such as —Br or —Cl, and $CF_2$=$CF(OCH_2(CF_2)_m X^2)$;
   (4) the group of monomers consisting of $CF_2$=$CR^2(COOR^3)$ where $R^2$ denotes —$CH_3$ or —F and $R^3$ denotes —H, —$CH_3$, —$C_2H_5$, or —$C(CH_3)_3$, and $CH_2$=$CR^2(COOR^3)$;
   (5) the group of monomers consisting of styrene, 2,4-dimethylstyrene, vinyltoluene, and 4-tert-butylstyrene; and
   (6) the group of monomers consisting of acenaphtylene, vinylketone represented as $CH_2$=$CH(COR^4)$ where $R^4$ denotes —$CH_3$, —$C_2H_5$, or a phenyl group (—$C_6H_5$),
   and vinyl ether represented as $CH_2$=$CH(OR^5)$ where $R^5$ denotes —$C_nH_{2n+1}$(n=1-5), —$CH(CH_3)_2$, —$C(CH_3)_3$, or a phenyl group.

2. The method for producing a functional membrane according to claim 1, wherein latent tracks that result from damage created by high-energy heavy ion irradiation penetrate the film in the ion irradiation step.

3. A method for producing a functional membrane comprising:
   a step of ion irradiation, in which a polymer film substrate containing nonconductive inorganic particles is irradiated with high-energy heavy ions to the extent of $10^4/cm^2$ to $10^{14}/cm^2$ such that radiation damage occurs thereto;
   a step of etching subsequent to the step of ion irradiation, in which the radiation damage is subjected to chemical or thermal etching treatment such that through holes are formed on the film substrate; and
   a step of graft polymerization, in which one or more monomers selected from group A are added to the thus obtained perforated film substrate with the use of active species remaining in latent tracks, which are damaged sites created by ion irradiation, or active species newly generated by gamma ray, electron beam, or plasma irradiation in vacuo or under an inactive gas atmosphere such that the monomers are graft polymerized exclusively with the surface or hole walls of the film substrate;
   wherein group A consists of
   (1) the group of monomers consisting of $CF_2$=$CF(SO_2X^1)$ where $X^1$ denotes a halogen group represented as —F or —Cl, $CH_2$=$CF(SO_2X^1)$, and $CF_2$=$CF(OCH_2(CF_2)_m SO_2X^1)$ where m denotes an integer from 1 to 4;
   (2) the group of monomers consisting of $CF_2$=$CF(SO_3R^1)$ where $R^1$ denotes an alkyl group represented as —$CH_3$, —$C_2H_5$, or —$C(CH_3)_3$, $CH_2$=$CF(SO_3R^1)$, and $CF_2$=$CF(OCH_2(CF_2)_m SO_3R^1)$;
   (3) the group of monomers consisting of $CF_2$=$CF(O(CH_2)_m X^2)$ where $x^2$ denotes a halogen group such as —Br or —Cl, and $CF_2$=$CF(OCH_2(CF_2)_m X^2)$;
   (4) the group of monomers consisting of $CF_2$=$CR^2(COOR^3)$ where $R^2$ denotes —$CH_3$ or —F and $R^3$ denotes —H, —$CH_3$, —$C_2H_5$, or —$C(CH_3)_3$, and $CH_2$=$CR^2(COOR^3)$;
   (5) the group of monomers consisting of styrene, 2,4-dimethylstyrene, vinyltoluene, and 4-tert-butylstyrene; and
   (6) the group of monomers consisting of acenaphtylene, vinylketone represented as $CH_2$=$CH(COR^4)$ where $R^4$ denotes —$CH_3$, —$C_2H_5$, or a phenyl group (—$C_6H_5$), and vinyl ether represented as $CH_2$=$CH(OR^5)$ where $R^5$ denotes —$C_nH_{2n+1}$(n=1-5), —$CH(CH_3)_2$, —$C(CH_3)_3$, or a phenyl group.

4. The method for producing a functional membrane according to claim 3, wherein the monomers are graft polymerized exclusively with hole walls of through holes 1 nm to 250 nm in pore size when using the active species remaining in latent tracks.

5. The method for producing a functional membrane according to claim 3, wherein the monomers are graft polymerized exclusively with hole walls of through holes 1 nm to 5 µm in pore size and the surface of the film substrate when using the active species newly generated by gamma-ray, electron beam, or plasma irradiation in vacuo or under an inactive gas atmosphere.

6. The method for producing a functional membrane according to claim 5, wherein, in the step of graft polymerization, the monomers are graft polymerized, following gamma-ray, electron beam, or plasma irradiation.

7. The method for producing a functional membrane according to claim 5, wherein the monomers are simultaneously graft polymerized by gamma-ray, electron beam, or plasma irradiation after being introduced into the film substrate in the step of graft polymerization.

8. The method for producing a functional membrane according to claim 1, further comprising a step of graft polymerization subsequent to the step of ion irradiation, in which 5 to 80 mol % monomers of group B consisting of crosslinking agents for group A are added to one or more monomers selected from group A such that the monomers are graft polymerized with the film substrate.

9. The method for producing a functional membrane according to claim 1, wherein the nonconductive inorganic particles are fine particles of one or more of silica ($SiO_2$), alumina ($Al_2O_3$), zirconia ($ZrO_2$), and $H^+$ type mordenite.

10. The method for producing a functional membrane according to claim 1, wherein the polymer film substrate has an oxygen permeability coefficient of 10.0 [cc*mm/($m^2$*day*atm)] or less at room temperature.

11. The method for producing a functional membrane according to claim 1, wherein the polymer film substrate comprises hydrocarbon polymers, and one or more monomers selected from group A are hydrocarbon monomers.

12. The method for producing a functional membrane according to claim 1, wherein the polymer film substrate comprises fluorocarbon polymers, and one or more monomers selected from group A are fluorocarbon monomers.

13. The method for producing a functional membrane according to claim 1, wherein one or more monomers selected from group C consisting of functional monomers having molecular weights of 200 or greater are added in the step of graft polymerization.

14. The method for producing a functional membrane according to claim 1, wherein one or more monomers selected from group D consisting of monomers containing functional groups, which are graft polymerized with difficulty, are added in the step of graft polymerization.

15. The method for producing a functional membrane according to claim 1, wherein the film substrate is allowed to come into contact with a gas such that the active species are made to disappear, and then the film substrate is irradiated with gamma rays, an electron beam, or plasma in vacuo or under an inactive gas atmosphere such that active species are generated again after the step of ion irradiation.

16. The method for producing a functional membrane according to claim 1, wherein a crosslinking structure is imparted to the polymer film substrate.

17. The method for producing a functional membrane according to claim 1, wherein the polymer film substrate is composed of a hydrocarbon, fluorocarbon, or hydrocarbon/fluorocarbon polymer film.

18. A functional membrane produced by the production method according to claim 1.

19. A functional membrane, which is made up of a polymer film substrate containing nonconductive inorganic particles that has an oxygen permeability coefficient of 10.0 [cc*mm/($m^2$*day*atm)] or less at room temperature and paths that contain functionality-bearing groups and have pore sizes of 1 nm to 5 μm.

20. The functional membrane according to claim 19, wherein pore sizes of the paths that contain functionality-bearing groups are within the scope of 1 nm to 250 nm.

21. A method for producing a polymer electrolyte membrane for fuel cells comprising:
a step of ion irradiation, in which a polymer film substrate containing nonconductive inorganic particles is irradiated with and penetrated by high-energy heavy ions to the extent of $10^4/cm^2$ to $10^{14}/cm^2$ such that active species are generated in the film substrate; and
a step of graft polymerization, in which one or more monomers selected from group A consisting of monomers containing cation exchange groups or functional groups capable of being transformed into cation exchange groups in subsequent steps are added such that the monomers are graft polymerized with the film substrate.

22. The method for producing a polymer electrolyte membrane for fuel cells according to claim 21, wherein the above film substrate is allowed to come into contact with a gas such that the above active species are made to disappear, and then the film substrate is irradiated with gamma rays, an electron beam, or plasma in vacuo or under an inactive gas atmosphere such that active species are generated again after the step of ion irradiation.

23. A method for producing a polymer electrolyte membrane for fuel cells comprising:
a step of ion irradiation, in which a polymer film substrate containing nonconductive inorganic particles is irradiated with high-energy heavy ions to the extent of $10^4/cm^2$ to $10^{14}/cm^2$ such that radiation damage occurs thereto;
a step of etching subsequent to the step of ion irradiation, in which the radiation damage is subjected to chemical or thermal etching treatment such that through holes are formed on the film substrate; and
a step of graft polymerization, in which one or more monomers selected from group A consisting of monomers containing functional groups are added to the thus obtained perforated film substrate with the use of active species remaining in latent tracks, which are damaged sites created by ion irradiation, or active species newly generated by gamma-ray, electron beam, or plasma irradiation in vacuo or under an inactive gas atmosphere such that the monomers are graft polymerized exclusively with the surface or hole walls of the film substrate.

24. The method for producing a polymer electrolyte membrane for fuel cells according to claim 23, wherein, to obtain such polymer electrolyte membrane, one or more monomers selected from group A consisting of monomers containing cation exchange groups or functional groups capable of being transformed into cation exchange groups in subsequent steps are added to the perforated film substrate obtained in the step of etching with the use of active species remaining in latent tracks, which are damaged sites created by ion irradiation, or active species newly generated by gamma-ray, electron beam, or plasma irradiation in vacuo or under an inactive gas atmosphere, such that the monomers are graft polymerized exclusively with the surface or hole walls of the film substrate so as to introduce the functional groups.

25. The method for producing a polymer electrolyte membrane for fuel cells according to claim 21 comprising a step of graft polymerization subsequent to the step of ion irradiation, in which 5 to 80 mol % monomers of group B consisting of crosslinking agents for group A are added to one or more monomers selected from group A consisting of the monomers containing useful functional groups such that the monomers are graft polymerized with the film substrate.

26. The method for producing a polymer electrolyte membrane for fuel cells according to claim 21, wherein the nonconductive inorganic particles are fine particles of one or more of silica ($SiO_2$), alumina ($Al_2O_3$), zirconia ($ZrO_2$), and $H^+$ type mordenite.

27. The method for producing a polymer electrolyte membrane for fuel cells according to claim 21, wherein the polymer film substrate has an oxygen permeability coefficient of 10.0 [cc*mm/(m$^2$*day*atm)] or less at room temperature.

28. The method for producing a polymer electrolyte membrane for fuel cells according to claim 21, wherein up to 80 mol % of one or more monomers of group B consisting of crosslinking agents for group A are added in the step of graft polymerization.

29. The method for producing a polymer electrolyte membrane for fuel cells according to claim 21, wherein a crosslinking structure is imparted to the polymer film substrate.

30. The method for producing a polymer electrolyte membrane for fuel cells according to claim 21, wherein the polymer film substrate is composed of a hydrocarbon, fluorocarbon, or hydrocarbon/fluorocarbon polymer film.

31. The method for producing a polymer electrolyte membrane for fuel cells according to claim 25, wherein the monomers are graft polymerized exclusively with hole walls of through holes up to 250 nm in pore size when using the active species remaining in the latent tracks.

32. The method for producing a polymer electrolyte membrane for fuel cells according to claim 25, wherein the monomers are graft polymerized with hole walls of through holes up to 1 μm in pore size when using the active species newly generated by gamma-ray, electron beam, or plasma irradiation in vacuo or under an inactive gas atmosphere.

33. The method for producing a polymer electrolyte membrane for fuel cells according to claim 32, wherein all through holes are filled with the cation exchange groups, and no cation exchange group is introduced inside of the film substrate as a result of the introducing of the cation exchange groups, followed by the graft polymerization of the monomers.

34. The method for producing a polymer electrolyte membrane for fuel cells according to claim 21, comprising adding one or more monomers selected from group C consisting of monomers that have molecular weights of 200 or greater and contain cation exchange groups or functional groups capable of being transformed into cation exchange groups in subsequent steps, in the step of graft polymerization.

35. An electrolyte membrane for fuel cells produced by the production method according to claim 21.

36. An electrolyte membrane for fuel cells, which is made up of a polymer film substrate containing nonconductive inorganic particles that has an oxygen permeability coefficient of 10.0 [cc*mm/(m$^2$*day*atm)] or less at room temperature and paths that contain cation exchange groups and have pore sizes of 1 nm to 5 μm.

37. The electrolyte membrane for fuel cells according to claim 36, wherein pore sizes of the paths that contain cation exchange groups are within the scope of 1 nm to 250 nm.

\* \* \* \* \*